Patented Feb. 20, 1951

2,542,190

UNITED STATES PATENT OFFICE 2,542,190

PROCESS FOR ALKYLATION OF AROMATICS

Manuel H. Gorin and Everett Gorin, Dallas, Tex., assignors, by mesne assignments, to Socony-Vacuum Oil Company, Incorporated, New York, N. Y., a corporation of New York No Drawing. Application May 6, 1946, Serial No. 667,731

6 Claims. (Cl. 260—671)

This invention relates to the nuclear alkylation of aromatic compounds with aliphatic alcohols to produce aromatic compounds having one or more aliphatic side chains. Such substituted aromatic compounds are of value in many fields involving the use of synthetic organic chemicals, and some are particularly desirable as constituents of high octane aviation fuels, and as intermediates suitable for use in the production of synthetic rubber. This application is a continuation-in-part of our copending application Serial No. 420,493, filed November 26, 1941, now abandoned, and our copending application Serial No. 460,654, filed October 3, 1942, now abandoned.

More particularly this invention relates to an improved process for the catalytic alkylation of these aromatic compounds. Catalytic processes for the alkylation of aromatic compounds are well known. Generally such catalytic processes make use of the Friedel-Crafts type catalyst, especially aluminum chloride or ferric chloride. Such catalysts are fairly satisfactory for small scale production, but are unsatisfactory for large scale production because of the great expense involved in the loss of large amounts of catalyst. The Friedel-Crafts type of catalysts form strong complexes with aromatic compounds so that separation of the products and recovery of the catalyst is difficult. Consequently even when these catalysts are promoted with halogen acids or in various other ways, they have definite drawbacks for large scale commercial use.

Various attempts have been made to use contact catalysts for the alkylation of aromatic compounds. Such processes have all suffered from the disadvantage of either requiring such long contact times and such large amounts of catalyst as to make continuous operation impossible or have required such high temperatures and pressures for the reaction as to be impractical from the standpoint of equipment design and operating costs.

It is an object of this invention to develop a type of catalyst which will have sufficient activity at slightly to moderately elevated temperatures to make the continuous alkylation of aromatic compounds feasible. It is a further object of the invention to develop such a continuous alkylation process which will not require the use of high pressures, although high pressures may be used in our process. Another object of our invention is to develop an improved catalyst for carrying out the alkylation reaction. Other objects of our invention will be apparent from the description thereof, in conjunction with the appended claims.

In general our invention consists in passing a mixture of an aromatic compound with an aliphatic alcohol through an alkylation zone at a temperature within the range of from about 50° to 375° C., and at a pressure of from atmospheric to 2000 pounds per square inch or higher over a contact catalyst of the mixed oxide type. The contact catalysts which have proven to have sufficient activity for a continuous low temperature alkylation process are composed of a mixture of an amphoteric oxide, such as the oxides of the metals of group II and group III of the periodic table, with a hydrated oxide of a weakly acidic nature, such as silica gel, hydrated boric oxide, thoria, zirconia, stannic acid, and the like. The preferred amphoteric oxides are those which are strongly amphoteric in character dissolving readily in both dilute aqueous acid and basic solutions. The oxide, in any event, must be capable of solution in both strong aqueous acid and basic solutions to be suitable for use as the amphoteric oxide constituent of our catalysts. The amphoteric oxide used should not be the amphoteric oxide of a metal easily oxidized to a non-amphoteric oxide of higher valence. For example, such oxides as stannous oxide and antimony trioxide are amphoteric, but the higher valence oxides of these metals are definitely acidic and the oxides of these metals are not suitable. The amphoteric oxide selected for use as the amphoteric oxide constituent of our catalysts should not be one which would be reduced to the metallic state by the hydrocarbons at the temperature at which the alkylation process was carried out. For example, lead oxide should not be used as the amphoteric oxide constituent of a catalyst of the type of our invention, where it is contemplated to utilize the catalyst in an alkylation process conducted at temperatures much above about 250° C. Typical suitable amphoteric oxides are alumina, zinc oxide, beryllium oxide, chromium oxide, gallium oxide, and the like. The use of mixtures of two or more of the amphoteric oxides as the amphoteric oxide constituent of our catalysts is also contemplated and is within the scope of our invention.

Our mixed oxide catalysts are characterized by being strongly acidic in character, and this strongly acidic character is the result of the special method used for the preparation of the catalysts. The amount of amphoteric oxide present in our mixed catalysts may vary from a few tenths of one per cent up to about fifteen to twenty per cent. The amount of amphoteric oxide required to give the greatest activity varies to a certain extent depending upon the particular oxide mixture used, and varies widely with the particular method of preparation used.

This variation in the preferred amount of amphoteric oxide is due, we believe, to a variation in the concentration of amphoteric oxide present at the catalyst surface with the different methods of preparation. It is our belief, although our invention should not be limited to any particular theoretical considerations, that the amount of amphoteric oxide present in the immediate neighborhood of the contact surfaces should be small relative to the amount of acidic oxide present. In the case of a catalyst prepared by the precipitation of aluminum oxide on neutral silica gel, the catalyst has good activity even though only a few tenths per cent of the total catalyst is composed of alumina, and the amount of alumina on the catalyst so prepared should not be above about three or four per cent. On the other hand a catalyst prepared by the coprecipitation of the mixed oxides should contain at least several per cent of the amphoteric oxide, and usually will contain as much as ten to twelve per cent or even higher, in order to have the greatest activity. Some naturally occurring mixed oxides, such as the alumina-silica clay known as "Floridin" may be activated by suitable treatment. These naturally occurring mixed oxides should also contain at least several per cent of the amphoteric oxide, and may contain as much as fifteen per cent or even slightly higher. The amphoteric oxide content of the mixed oxide catalysts is probably not as accurate a way of describing the composition as the amphoteric oxide-acidic oxide ratio, because of the presence of varying amounts of inert material, principally water, in the catalysts, depending upon their origin and mode of treatment in the case of the activated natural catalysts, or their method of preparation in the case of the synthetics. The amount of water will vary from about four or five per cent to about twenty-five per cent, and several per cent of other materials, principally iron oxide, may be present in the natural catalytic oxide mixtures. The ratio of amphoteric oxide to acidic oxide is thus a more definite value since the variation in amount of these extraneous materials is discounted in its determination. The ratio of amphoteric oxide to acidic oxide in our active catalysts will vary from a few thousandths to about 0.05 to 1 in the case of the amphoteric oxide deposited on acidic oxide type of catalyst, and from about 0.02 to about 0.20 to 1 in the case of the coprecipitated catalyst and naturally occurring catalyst.

The coprecipitated oxides and the naturally occurring mixed oxides may be activated by washing with a solution of a strong acid for controlled periods of time. Particularly with the coprecipitated oxides, as excessive washing even with a cold acid should be avoided, otherwise the amphoteric oxide will be removed to such an extent that the catalyst will be substantially inactive. The coprecipitated oxides may also be activated by treatment with a solution of a salt of a weak base and a strong acid such as an aluminum sulphate solution. One advantageous way for preparing such a coprecipitated catalyst is to precipitate a sodium silicate solution with an excess of aluminum sulphate so that the resulting supernatant solution is acid.

The naturally occurring oxides should be treated with rather concentrated acid solutions. Several successive treatments should be used, and these should preferably be alternated with a washing with alkaline solutions although this is not essential. The final treatment should, of course, be an acid washing. A long digestion with hot, concentrated acid should be avoided, however, as this will substantially completely remove any amphoteric oxide from the catalyst surface and substantially inactivate the catalyst. In order that the contact surfaces of the catalyst will retain some amphoteric oxide, it would seem that the amount of amphoteric oxide present in the catalyst as a whole must be a fairly high value. The acid activation step removes most of the amphoteric oxide from the exposed surfaces of the catalyst and lowers the total amphoteric oxide content to a certain extent. In the case of a naturally occurring clay, or a synthetic catalyst of the coprecipitated, mixed oxide type, the acid treatment should not be carried out to such an extent that the acid disintegrates the structure of the catalyst, dissolving out all or nearly all of the amphoteric oxide because such treatment would substantially completely remove all amphoteric oxide from the actual contact surfaces. Such a catalyst would be relatively inactive.

In view of the great difficulty in determining the details of the actual molecular and crystalline structure of the contact surface of the catalyst, the theory advanced as to the extremely small amounts of amphoteric oxide required in the case of catalysts prepared by the precipitation of such oxide on a hydrated acidic oxide has not been proven. It does fit in well, however, with the requirement of considerably larger amounts of amphoteric oxide in the case of catalysts prepared by coprecipitation of the mixed oxides or by acid treatment of naturally occurring oxide mixtures.

By the use of the metallic oxide catalysts prepared in accordance with our invention high rates of conversion are obtained. In order to utilize this advantage fully from an economic standpoint, relatively short times of contact are employed. With the more reactive alcohols the reaction mixture may be passed over the catalyst at a rate such that the standard or gas space velocity per minute is as high as fifty, or even higher. By standard or gas space velocity is meant the volume of reactants as ideal gases entering the reaction chamber per minute on the basis of standard conditions of temperature and pressure per unit volume of catalyst employed. Where the reaction is carried out in the liquid phase, the gaseous space velocity may be calculated from the liquid space velocity measured at the reaction conditions. The liquid space velocity corresponding to a standard gas space velocity of fifty minutes$^{-1}$ will vary over a range of from about fifteen hours$^{-1}$ to about thirty hours$^{-1}$, depending upon the liquid density of the alcohol and the aromatic hydrocarbon at the reaction conditions, the mol ratio of aromatic to alcohol in the reaction mixture, the temperature and pressure of the reaction zone, and the molar weight of the alcohol and of the aromatic hydrocarbon. In any event liquid space velocities greater than about four or five hours$^{-1}$ should be used, corresponding to an actual contact time of not exceeding fifteen minutes. As used hereinabove and throughout the specification and claims, contact time means the residence time of the reactants in the reaction vessel when calculated on the basis of an empty vessel under the operating conditions prevailing therein.

Our invention is applicable to the alkylation of aromatic hydrocarbons of the benzene and naphthalene series. These hydrocarbons may be substituted or unsubstituted, with the limitation that they must be free from nitrogen-containing substituent groups. We have found that nitrogen-containing substituents, particularly nitro compounds and amines, are apt to poison our catalysts.

Our invention may be carried out either in the liquid or in the vapor phase. Since the preferred operating temperatures lie within the range of from 200° C. to 350° C. vapor phase operation offers the advantage that high pressures are not necessary. For vapor phase operation the process is preferably carried out at pressures of between 6 to 20 atmospheres. For liquid phase operation, the pressure must necessarily be sufficiently high to keep the reactants liquid. With the reactants in the liquid phase, the transfer of heat from the reactants to the outer walls of the reaction vessel and to cooling coils is much simpler. Since the reaction is exothermic, it is desirable to be able to get rid of this heat of reaction so that the temperature and pressure of the reactants may be kept at the desired value. Another advantage for liquid phase operation is that the product contains a higher ratio of monoalkylated product to poly-alkylated products. Where a mono-alkylated product is desired this is obviously an advantage. A further advantage obtained from liquid phase operation is longer catalyst life. One possible explanation for the longer catalyst life obtained by using liquid phase conditions is that the liquid hydrocarbons act as a solvent for much of the impurities and byproduct material formed, which would normally tend to accumulate on the surface of the catalyst and inhibit its activity.

The alkylating agents used are the aliphatic alcohols containing not more than twelve carbon atoms. Aliphatic alcohols, such as methyl alcohol, ethyl alcohol, propyl alcohol, isopropyl alcohol, amyl alcohol, octyl alcohol, and the like, may be used.

We are especially interested in the alkylation of the simple aromatic compounds such as benzene, toluene, xylene, naphthalene, etc. In general, the substituted aromatic compounds may be used with the restriction that there must be at least one hydrogen attached to the aromatic nucleus, since the alkylation reaction involves the displacement of a nuclear hydrogen. The aromatic nucleus must, however, be free from nitro, amino, or other nitrogen containing substituent group because of the effect of nitrogen compounds in poisoning our contact catalyst. Preferably, not more than two of the nuclear hydrogen atoms are substituted.

The preparation of catalysts suitable for use in our process is illustrated by the following examples:

*Example 1*

A coprecipitated alumina-silica catalyst was prepared by the addition with constant stirring of a sufficient amount of dilute aluminum sulphate solution to dilute sodium silicate solution so that the final mixture was just acid to litmus. The alumina-silica mass was filtered and washed several times with distilled water. It was then washed once with 5N HCl, followed by successive washings with distilled water until the wash water was free of chloride ion. The catalyst was dried for 24 hours at 125° C. This catalyst gave the following analysis by weight:

| | Per cent |
|---|---|
| $Al_2O_3$ | 9.1 |
| $SiO_2$ | 66.5 |
| Water | 24.4 |

The alumina-silica ratio for this catalyst was 0.14 to 1.

*Example 2*

An alumina on silica catalyst was prepared by the hydrolytic precipitation of alumina on the surface of a precipitated hydrated silica gel. The silica gel was prepared from a dilute solution of sodium silicate by precipitation with a slight excess of hydrochloric acid. The precipitated silica gel was then washed free of chloride ion. Alumina was precipitated on the surface of the silica gel by contacting the gel with a 0.2N aluminum sulphate solution at 90° C. for two hours. The catalyst was then washed until sulphate ion could no longer be detected in the wash water, and then dried at 125° C. for 48 hours. This catalyst gave the following analysis by weight:

| | Per cent |
|---|---|
| $Al_2O_3$ | 2.1 |
| $SiO_2$ | 92.1 |
| Water | 5.5 |

The alumina-silica ratio for this catalyst was 0.023 to 1.

*Example 3*

A sample of a commercial fuller's earth mined in Florida, having the trade name of "Floridin" was dehydrated by heating for four hours at 500° to 550° C. The catalyst was then activated by successive treatments with 30% concentrated hydrochloric acid and sodium hydroxide solutions. After a final treatment with hydrochloric acid, the catalyst was washed with distilled water until the wash water was free of chloride ion and ferric ion. The catalyst was then dried at 125° C. for twenty-four hours. The catalyst gave the following analysis by weight:

| | Per cent |
|---|---|
| $Al_2O_3$ | 12.0 |
| $SiO_2$ | 66.7 |
| $Fe_2O_3$ | 2.3 |
| Water | 10.1 |

The alumina-silica ratio for this catalyst was 0.18 to 1.

*Example 4*

A solution of 60 grams of beryllium nitrate in 400 cc. of distilled water was added to 200 cc. of a sodium silicate solution containing a total of 29 grams of dissolved silica. After thorough mixing of the two solutions sufficient 5N hydrochloric acid was added to make the mixture just acid to litmus. The resulting precipitate was filtered and washed until free from chloride ion. The precipitate was then again washed with 0.5N HCl and then with distilled water until free from chloride ion. The catalyst was dried at 125° C. for twenty-four hours. This catalyst showed the following analysis by weight:

| | Per cent |
|---|---|
| BeO | 0.50 |
| $SiO_2$ | 89.5 |
| Water | 10.0 |

The beryllia-silica ratio for this catalyst was 0.006 to 1.

*Example 5*

A zinc oxide-silica catalyst was prepared in the same manner as the beryllia-silica catalyst of Example 4, except that a solution of 37 grams of zinc chloride dissolved in 500 cc. of water was used in place of the beryllium nitrate solution. The analysis of the dried catalyst showed:

| | Per cent |
|---|---|
| ZnO | 0.42 |
| $SiO_2$ | 88.83 |
| Water | 10.8 |

The zinc oxide-silica ratio for this catalyst was 0.005 to 1.

Example 6

26 grams of precipitated silica gel prepared as set forth in Example 2 digested with 500 cc. of a 0.3N solution of chromic nitrate at 90° to 95° C. for two hours. The silica catalyst was filtered and washed four times with 300 cc. of distilled water each time. The catalyst was dried at 125° C. for 24 hours. This catalyst gave the following analysis by weight:

| | Per cent |
|---|---|
| $Cr_2O_3$ | 0.12 |
| $SiO_2$ | 94.1 |
| Water | 4.9 |

The chromium oxide-silica ratio for this catalyst was 0.0013 to 1.

Example 7

Another sample of the fuller's earth "Floridin" was dehydrated for four hours at 500° C. to 550° C. This sample was washed with cold concentrated HCl until the acid washing was iron free, and then the catalyst was washed until the wash water was free of the chloride ion. The catalyst was dried at 125° C. for 24 hours. This catalyst on analysis showed the following composition on a weight basis:

| | Per cent |
|---|---|
| $Al_2O_3$ | 12.7 |
| $SiO_2$ | 66.7 |
| Fe | 2.6 |
| Cl | 0.3 |
| Water | 6.5 |

The alumina-silica ratio for this catalyst was 0.19 to 1.

Example 8

A sample of ordinary commercial fuller's earth was activated by contacting it with 30 per cent hydrochloric acid at 100° C. for about an hour. The catalyst was then washed with distilled water until free from chloride ion, and dried at 125° C. for four hours. This catalyst on analysis showed the following composition on a weight basis:

| | Per cent |
|---|---|
| $Al_2O_3$ | 11.6 |
| $SiO_2$ | 72.3 |
| $Fe_2O_3$ | 1.4 |
| $H_2O$ | 8.4 |

The alumina-silica ratio for this catalyst was 0.16 to 1.

Example 9

Another sample of the fuller's earth "Floridin" was activated by washing with cold concentrated hydrochloric acid until the wash water is iron free. The sample was then washed with distilled water until the wash water was free of chloride ions, and dried at 125° C. for four hours. This catalyst on analysis showed the following composition by weight:

| | Per cent |
|---|---|
| $Al_2O_3$ | 10.9 |
| $SiO_2$ | 70.6 |
| Fe | 2.3 |
| $H_2O$ | 9.1 |

The alumina-silica ratio for this catalyst was 0.15 to 1.

Our catalysts gradually lose activity because of the deposition of coke or difficulty volatile carbonaceous material thereon, even when used in liquid phase operation, until the catalyst reaches a point where it must be either regenerated or discarded. The spent alumina-silica catalysts, for example, can be regenerated to a substantial portion of their original activity by the removal of the deposited carbonaceous material. This carbonaceous material may be most simply removed by an oxidation process. When the catalyst is heated above about 550° to 600° C. depending upon the individual catalyst, it loses its activity almost completely within a short time. A catalyst that has been heated to or above this deactivation temperature is no longer suitable for use in a continuous alkylation process. Because of the thermosensitivity of our catalysts, the oxidation should be carefully controlled to prevent the catalyst from heating above the deactivation temperature. The oxidation-regeneration step is generally satisfactory if carried out within a relatively short time period and within the temperature range of from about 450° to about 550° C.

The following examples show the mode of operation of our invention for the continuous alkylation of benzene with typical aliphatic alcohols. The examples are given in the illustrative sense only, and our invention should not be construed as limited to the reactants and reaction conditions employed therein.

Example 10

A mixture of benzene and methyl alcohol containing 20 mol per cent of methyl alcohol was passed over a coprecipitated alumina-silica catalyst prepared as described in Example 1 at a temperature of 370° C. and under a pressure of 135 pounds per square inch. A standard space velocity of 31 $minutes^{-1}$ (actual contact time 0.14 minute) was employed. 24.4 per cent of the methyl alcohol was converted to methyl benzenes. 78 mol per cent of the alkylate product consisted of toluene.

Example 11

A mixture of benzene and ethyl alcohol containing 20 mol per cent of the latter was passed over a coprecipitated alumina-silica catalyst prepared as described in Example 1 at a temperature of 270° C. and under a pressure of 255 pounds per square inch. A standard space velocity of 46.8 $minutes^{-1}$ (actual contact time 0.24 minute) was employed. 4 per cent of the ethyl alcohol was converted to ethyl benzenes, substantially all of which was mono-ethyl benzene. The yield on the basis of ethyl alcohol fed to the process obviously may be increased by recycling the unconverted ethyl alcohol or by using a longer contact time.

Example 12

A mixture of benzene and isopropyl alcohol containing 33⅓ mol per cent of the latter was passed over an alumina on silica catalyst prepared as described in Example 2 at a temperature of 285° C. and under a pressure of 500 pounds per square inch. A liquid space velocity of 15 $hours^{-1}$ (actual contact time 4.00 minutes) was employed. 58 per cent of the isopropyl alcohol was converted to isopropyl benzenes, of which 72 mol per cent consisted of cumene.

From the above examples it will be noted that ethyl alcohol is considerably less reactive than methyl alcohol or isopropyl alcohol, even allowing for the differences in reaction conditions. In general, the primary alcohols are less reactive than the secondary or tertiary alcohols. This lower reactivity is particularly exhibited by ethyl alcohol. The mixed oxide catalysts are very effective, however, for the alkylation of aromatic hydrocarbons with alcohols having 8 or less carbon atoms. Alcohols having more than 8 carbon atoms gradually show diminishing reactivity, and we prefer to use alcohols having no more than 12 carbon atoms as the alkylating agents. Cetyl alcohol, for example, exhibited a very low order of reactivity under non-cracking conditions. The mixed oxide catalysts, particularly alumina-silica, are cracking catalysts, however, and by the use of the higher alkylating temperatures and the longer contact times within the ranges indicated, alkylation will occur, but the alkyl radical substituted will not correspond in length of chain to the alcohol alkylating agent employed. The long chain alcohols, however, do not represent an economical source material for cracking to short chain alkylating agents.

Alumina-silica catalysts represent the preferred class of catalyst because of their low cost, regenerability, high rate of conversion obtained, and their stability at the operating conditions employed. The synthetic type of alumina-silica catalyst, such as the coprecipitated alumina-silica and alumina precipitated on silica type whose preparation is illustrated by Examples 1 and 2, are particularly preferred.

Not all acid-treated alumina-silica clays are suitable for our process. Not only must the clay be acid treated to produce the necessary activation, but also the structure and composition of the original natural clay must be such that the acid treatment is capable of producing the necessary activation. The exact composition and structural requirements are difficult of definition since so many forms of alumina-silica clays are in existence. Apparently the mild acid treatment used must be capable of removing the major portion of the alumina from the catalytic surfaces, and this is evidenced best by the reduction of the average alumina content to less than one-fifth that of the silica.

The essential property of a contact catalyst of the mixed amphoteric acidic oxide type would seem to be that it possess rather strong acidic properties. The acid-treated mixed oxide catalysts possess this property, while both silica alone and alumina alone are weakly acidic. In general catalytic alkylation reactions involve acid catalysts of some sort. Although we do not wish to be bound to any particular theoretical considerations, we believe its catalytic activity may be attributed to its acidic nature.

The reason for the enhanced acidic properties of the alumina on silica catalyst may be found by a consideration of the structure of silica gel. It is believed that the gel is formed by the successive splitting out of water from silicic acid $Si(OH)_4$ to form a lattice structure, the basic unit of which consists of a tetrahedral disposition of 4 oxygen ions around a central $Si^{4+}$ ion. The surface is characterized by the presence of hydroxyl groups that have not been split out as water in the condensation process. All the water of hydration is present on the surface as weakly acidic hydroxyl groups and the amount of hydration is therefore dependent on the surface area or degree of subdivision of gel. When alumina is adsorbed on the gel it can therefore be assumed that a salt is formed between the weakly acidic silica hydroxyls and one of the amphoteric hydroxyls of the aluminum hydroxide. The result is the enhancement of the acidic properties of the two remaining free hydroxyl groups of the alumina. In other words, the absorption of the alumina results in the formation of the relatively strong surface alumina-silicic acid.

It is readily seen, therefore, that for similar reasons the absorption of any amphoteric hydroxide on silica gel will similarly result in the development of strongly acid properties by the surface with consequent catalytic activity for alkylation reactions.

Other hydrated oxides which possess weakly acidic properties and which may be prepared in a gel of very finely divided state may be used. Thus, hydrated boric oxide, thoria, zirconia, titania, stannic acid and the like may serve as a support for the amphoteric oxides. The above acidic oxides may also be used in admixture with silica.

The yield per unit weight of catalyst may be increased by increasing the pressure at which the reaction is carried out. This is particularly true when operating in the liquid phase. One reason for the increase in yield increase in pressure is the increase in throughput and standard space velocity that may be obtained even though the actual space velocity of the reaction mixture at the higher pressure may be the same as at the lower pressure. In general, the denser and more vitreous catalysts are more affected by changes in the pressure at which the alkylation reaction is conducted. For example, "Floridin" becomes relatively more effective, as compared with the alumina-silica catalyst, as the pressure at which the alkylation is carried out is raised, indicating that the former catalyst is more pressure sensitive.

Liquid phase operation favors the formation of higher ratios of mono-alkylate to poly-alkylate product. This is probably due to the tendency of the alkylate product in vapor phase operation to accumulate on the catalyst surface where it is more favorably situated to react with additional alcohol to form a poly-alkylate product. When the reaction is carried out under higher pressure so that the reactants are maintained in the liquid phase, the liquid hydrocarbons present tend to dissolve the mono-alkylate product from the catalyst. As a result of this solution effect, the concentration of the mono-alkylate and aromatic hydrocarbons at the catalyst surface is substantially the same as elsewhere throughout the reaction mixture. Since the reaction is preferably carried out using a considerable excess of aromatic hydrocarbons, the amount of mono-alkylate product even at the end of the reaction will be much less than the amount of aromatic hydrocarbon and hence the alcohol will react with the aromatic hydrocarbon rather than the mono-alkylate product as the predominant reaction.

The reaction between the aromatic compounds and the aliphatic alcohols becomes appreciable at temperatures considerably below 100° C., particularly where the more active catalysts, such as the synthetic alumina-silica catalysts, are used. With the short chain alcohols temperatures up to about those employed for regeneration, i. e., up to about 425° C. or slightly higher may be employed. Temperatures below 400° C. are preferred since increasing the temperature above 400° C. does not appreciably improve the yield. With the longer chain alcohols, i. e., alcohols of four or more carbon atoms, temperatures below 400° C. and preferably below 375° C. should be used in order to avoid cracking of the alcohol. The preferred temperature range for carrying out our process is from 200° to 350° C. As mentioned previously it is frequently desirable to carry out the reaction in the liquid phase in order that a high ratio of mono-alkylate to poly-alkylate product will be obtained and for other reasons previously discussed. Where liquid phase operation is to be used the temperature is preferably maintained between 200° and 275° C. in reactions involving the short chain alcohols in order to avoid the necessity for the use of excessively high pressures to maintain the reactants in the liquid phase.

The ratio of the amount of aromatic hydrocarbon to alcohol which is fed into the reaction zone is not critical. So long as there are replaceable nuclear hydrogen atoms present we have not noted any tendency for polymerization or for other side reactions to occur. This is surprising inasmuch as these catalysts are excellent polymerization catalysts. It is therefore evident that in order to avoid these undesirable side reactions it is advisable to maintain the ratio of aromatic compound to alcohol greater than 1 to 1. We generally prefer to operate with the ratio of aromatic compound to alcohol greater than 2 to 1. This higher ratio results in a more efficient use of the alcohol. The percentage of alcohol converted will be increased to a certain extent by increasing this ratio, although this increase is accomplished at some sacrifice in the yield per unit weight of catalyst, assuming that the other factors remain constant. Increasing this ratio will also increase the percentage of mono-alkylate to poly-alkylate product through the effect of having a greater percentage of aromatic compounds present as unalkylated aromatic componds. The alcohol will preferentially alkylate the original aromatic, rather than the mono-alkylate present in the reaction mixture.

Having described our invention and the manner in which the same is to be carried out, many modifications thereof will be apparent to those skilled in the art. Our invention should not be limited except as indicated in the appended claims.

We claim:

1. A process for producing substantial yields of alkylated aromatic hydrocarbons which comprises subjecting aromatic hydrocarbons and alcohols to contact with a composite catalyst comprising precipitated silica and alumina for a time of contact of not more than 15 minutes.

2. A process for producing substantial yields of alkylated aromatic hydrocarbons which comprises subjecting aromatic hydrocarbons and alcohols to contact with a synthetically prepared composite mass of silica and an oxide selected from the group consisting of alumina, zirconia, and thoria for a time of contact of not more than 15 minutes.

3. A process for producing substantial yields of toluene which comprises subjecting benzene and methyl alcohol to contact with a composite catalyst comprising precipitated silica and alumina for a time of contact of not more than 15 minutes.

4. A process for producing substantial yields of aromatic hydrocarbons which comprises subjecting aromatic hydrocarbons and aliphatic alcohols of not more than twelve carbon atoms to contact with a composite catalyst comprising precipitated silica and alumina at a temperature of from about 200° C. to about 425° C. for a time of contact of not more than 15 minutes.

5. A process for producing substantial yields of aromatic hydrocarbons which comprises subjecting aromatic hydrocarbons and aliphatic alcohols of not more than twelve carbon atoms to contact with a composite catalyst prepared by the precipitation of alumina from a solution of a soluble aluminum salt on a silica gel in a medium having a pH less than 7 in which the weight ratio of silica to alumina is from 1 to 0.05 to 1 to 0.001 at a temperature of from about 200° C. to about 425° C. for a time of contact of not more than 15 minutes.

6. A process for producing substantial yields of aromatic hydrocarbons which comprises subjecting aromatic hydrocarbons and aliphatic alcohols of not more than twelve carbon atoms to contact with a composite catalyst prepared by the coprecipitation of alumina and silica from a mixed solution of a soluble aluminum salt and a soluble silicate in which the ratio of silica to alumina is from 1 to 0.2 to 1 to 0.02 at a temperature of from about 200° C. to about 425° C. for a time of contact of not more than 15 minutes.

MANUEL H. GORIN.
EVERETT GORIN.

REFERENCES CITED

The following references are of record in the file of this patent:

UNITED STATES PATENTS

| Number | Name | Date |
| --- | --- | --- |
| 2,384,505 | Thomas et al. | Sept. 11, 1945 |